United States Patent [19]

Chaya

[11] Patent Number: 4,639,879

[45] Date of Patent: Jan. 27, 1987

[54] METHOD AND DEVICE FOR LIGHT EMITTING INTENSITY CONTROL IN A GRAPHIC DISPLAY DEVICE

[75] Inventor: Hiromi Chaya, Shiga, Japan

[73] Assignee: Dainippon Screen Seizo Kabushiki Kaisha, Kyoto, Japan

[21] Appl. No.: 466,503

[22] Filed: Feb. 15, 1983

[30] Foreign Application Priority Data

Feb. 19, 1982 [JP] Japan .................................. 57-25618

[51] Int. Cl.[4] .................................................. G06F 3/14

[52] U.S. Cl. ..................................... 364/518; 364/521; 340/744; 340/721; 340/703

[58] Field of Search ................ 364/518, 521, 488–491; 340/703, 707, 723, 747, 793, 715, 720, 721, 744; 358/283, 298, 767

[56] References Cited

U.S. PATENT DOCUMENTS

| | | | |
|---|---|---|---|
| 3,941,926 | 3/1976 | Slobodzian et al. | 340/720 X |
| 4,006,298 | 2/1977 | Fowler et al. | 340/793 X |
| 4,020,281 | 4/1977 | Davis, Jr. | 340/720 X |
| 4,165,506 | 8/1979 | Brands et al. | 340/744 X |
| 4,193,095 | 3/1980 | Miiushima | 340/793 X |
| 4,237,457 | 12/1980 | Houldsworth | 340/744 X |
| 4,345,313 | 8/1982 | Knox | 340/744 X |
| 4,393,378 | 7/1983 | Danielsen | 340/744 |
| 4,395,707 | 7/1983 | Satrapa | 340/707 X |
| 4,414,544 | 11/1983 | Suste | 340/793 X |
| 4,481,594 | 11/1984 | Staggs et al. | 364/521 |
| 4,490,797 | 12/1984 | Staggs et al. | 340/703 X |

*Primary Examiner*—Edward J. Wise
*Attorney, Agent, or Firm*—McKee, Thomte, Voorhees & Sease Zarley

[57] ABSTRACT

While characters are being displayed on a graphic display device according to commands from a computer, the light emitting intensity of a desired pixel is controlled by outputting only commands related to the light emitting intensity control from said computer. This is done by providing, associated with the graphic display device, for memorizing a group of numerical values corresponding to desired changes of light emitting intensity of a desired pixel belonging to a character or a graphic display displayed on the graphic display device, or by providing for obtaining numerical values corresponding to the light emitting intensity changes. A device for practicing this method is also disclosed.

27 Claims, 16 Drawings

FLOW DIAGRAM

METHOD AND DEVICE FOR LIGHT EMITTING INTENSITY CONTROL IN A GRAPHIC DISPLAY DEVICE

BACKGROUND OF THE INVENTION

The present invention relates to a method, and a device for performing it, for making parts of a graphics display such as for example specific characters or lines which are being displayed thereon stand out distinctly from other parts of the display, typically from the main part of the display. The present invention is particularly effective for utilization with a monochromatic graphic display device, but is also applicable to a multi color graphic display device such as a color CRT monitor.

This making parts of the display more prominent is required in the current computer graphic display art, for example when displaying statistical data and design plans for machinery or buildings. For example, such a process and device are used in the processes of graphic design of automobiles, ships, industrial machines, industrial plants, printed circuit boards, integrated circuits, LSI circuits, and buildings. In these graphic display processes, various data including drawings are displayed on a graphic display device such as a CRT, according to data and commands from an input device or data and commands from a computer system.

Conventionally two methods have been practiced to make a certain or specific portion of a graphics display on such a monochromatic display device distinct from the other portions of the display. One is the method of causing the specific portion to flash, and the other is the method of making it distinct by causing it to have a different light emitting intensity, i.e. to be brighter or darker than the rest of the graphics display.

However, according to the above described conventional methods, when the flashing or the particular light emitting intensity of the specific portion is desired to be changed, (for instance when the light emitting intensity or brightness of the specific portion is desired to be reduced gradually), the light emitting intensity or the flashing condition is changed by a computer, which has to issue instructions each time that this has to be done. The computer is required to execute a program in order to determine these instructions, repeatedly, and the processing time of this program is quite considerable, so that most of the time of the computer is taken up by this display alteration task. The main task of the computer is subordinate to the task of display alteration, being put onto standby while the display is altered, and the execution time for this main task is accordingly prolonged.

Now, it is known in the art to alter the light emitting intensity of the entire screen of the graphic display device simultaneously in the same way with hardware, and in this case the same light intensity alteration computation is carried out for each of the pixels on the screen; but it has not been previously known or contemplated for the light emitting intensity of individual pixels on the screen or for the light emitting intensity of certain parts of the screen to be altered in a different manner from others by hardware.

SUMMARY OF THE INVENTION

Accordingly, it is the primary object of the present invention to provide a method for carrying out different computations for each pixel or for each of various portions of a single screen graphic display, so that, instead of the computer outputting numerical values corresponding to the light emitting intensity changes of a desired pixel, a method is provided for giving the light emitting intensity an element of time dependence.

A further object of the present invention is to provide a method for making one or more portions of the graphic display distinct, while minimizing the load on the computer of the system, by providing a means for memorizing a group of numerical values corresponding to the desired light emitting intensity changes of a desired pixel or portion of the pattern, or a means for deriving numerical values corresponding to the light emitting intensity changes, and by thus letting the computer output only commands for the position of pixels, the start of light emitting intensity control, the end of light emitting intensity control, selection of light emitting intensity control pattern, and change of light intensity control pattern.

It is a further object of the present invention to provide a method for changing the light emitting intensity changing rate of the screen of a CRT over a wide range from rapid to slow while using a CRT which uses on its screen a fluorescent material with a short light persistence.

Further concomitant objects of the present invention are to provide a device for practicing such methods.

According to the most general method aspect of the present invention, these and other objects relating to a method are accomplished by a method for light emitting intensity control in a graphic display device, characterized by, in displaying characters and graphic displays on the graphic display device according to commands from a computer, controlling the light emitting intensity of a desired pixel by outputting only commands related to the light emitting intensity control from said computer by providing, associated with the graphic display device, a means for memorizing a group of numerical values corresponding to desired changes of light emitting intensity of a desired pixel belonging to a character or a graphic display displayed on the graphic display device, or by providing a means for obtaining numerical values corresponding to the light emitting intensity changes.

Further, according to a device aspect of the present invention, these and other objects relating to a device are accomplished by a device for light emitting intensity control in a graphic display device, comprising: (a) a computer which inputs a light emitting intensity control start signal, a signal designating the light emitting intensity signal and the kind of computation, and a computational constant or a signal designating a computational constant; (b) a memory device which stores these commands; (c) an instruction decoder for decoding these commands; (d) a computation unit for computing from the light emitting intensity signal and the computational constant; and (e) a display unit which displays at a light emitting intensity corresponding to the computational result of the computational unit.

According to a more particular device aspect of the present invention, these and other objects are more particularly accomplished by such a device as described above, wherein the computational cycle of the computational unit is set to a frequency which does not synchronize with a frame frequency determined by the display system of the graphic display device.

On the other hand, according to another alternative device aspect of the present invention, these and other objects relating to a device are accomplished by a device for light emitting intensity control in a graphic display device, comprising: (a) a computer which inputs a light emitting intensity control start signal and a light emitting intensity pattern selection signal; (b) a first memory device which stores these commands; (c) an instruction decoder for decoding these commands; (d) a second memory device for storing a light emitting intensity control pattern; (e) a counter for designating the address of the second memory in which the light emitting intensity control pattern is stored; and (f) a display unit which displays at a light emitting intensity corresponding to the signal read out from the memory.

BRIEF DESCRIPTION OF THE DRAWINGS

The present invention will now be shown and described with reference to several preferred embodiments thereof, and with reference to the illustrative drawings. In the drawings, like parts and features are denoted by like reference symbols in the various figures thereof, and.

DESCRIPTION OF THE PREFERRED EMBODIMENTS

Figure 1:
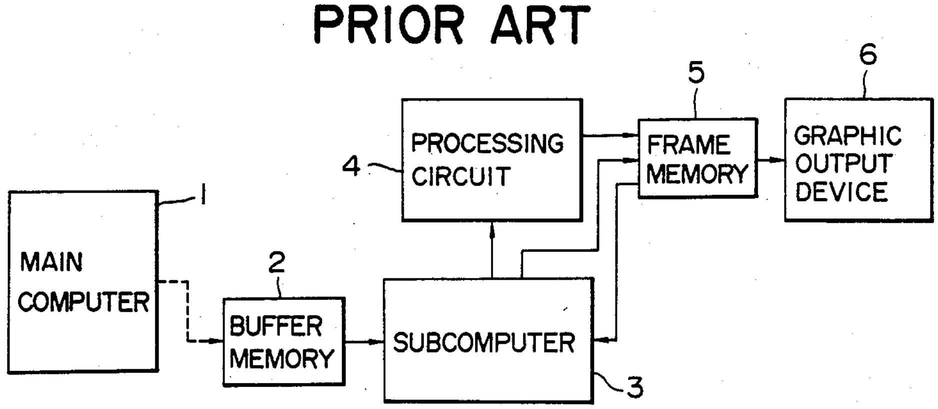
FIG. 1 PRIOR ART
FIG. 1 is a block diagram showing the structure of a particular exemplary conventional graphic display system.
Figure 2:
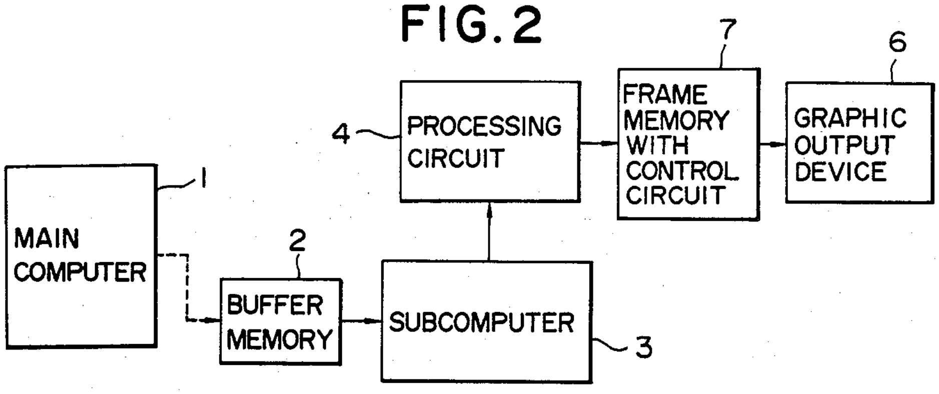
FIG. 2 is a block diagram of the structure of the preferred embodiment of the graphic display system according to the present invention.
Figure 17:
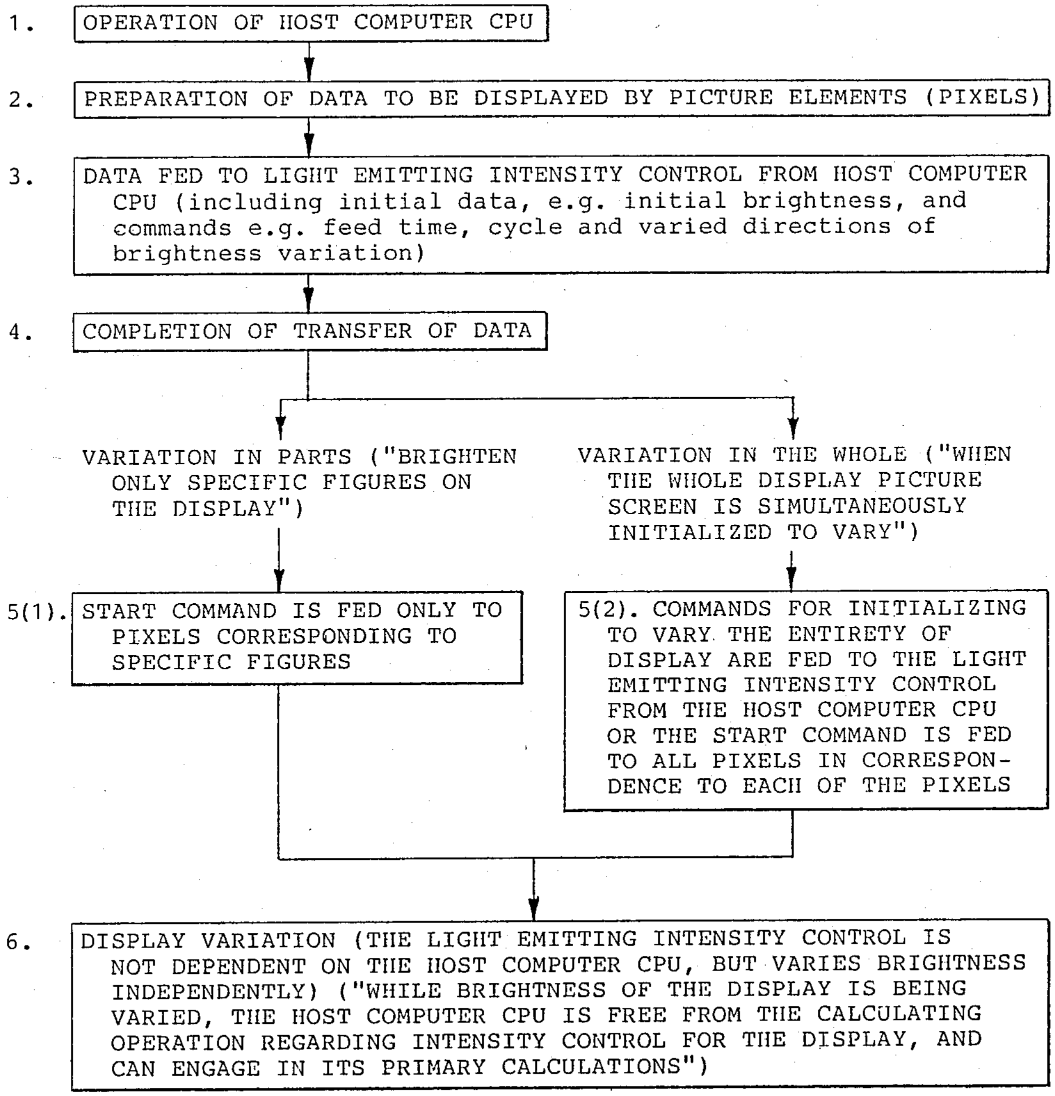
FIG. 17 is a flow chart showing the basic operational steps fo the invention.

The present invention will now be described with reference to several preferred embodiments thereof, and with reference to the appended drawings. FIG. 1 is a block diagram showing the structure of a particular exemplary conventional graphic display system, and FIG. 2 is a similar figure showing the structure of the preferred embodiment of the present invention. These figures show the flow of signals which represent display graphics. In the drawings, the reference numeral 1 denotes a main computer, 2 denotes a buffer memory, 3 denotes a subcomputer, 4 denotes a processing circuit, 5 denotes a frame memory, 6 denotes a graphic display device, and 7 denotes a frame memory with a pixel light emitting intensity control circuit. FIG. 17 depicts the general operational steps of the invention in flow diagram form.

The present invention will be described by taking as an example an automatic drafting system for printed circuit boards. An automatic drafting system for printed circuit boards, of a type which is widely used at the present time, inputs a handwritten wiring pattern using a a digitizer or the like and accurately drafts it using an automatic drafting machine which is not shown in the drawing. Thus, first, this handwritten wiring pattern is placed on a digitizer which is not shown in the drawings, and the wiring pattern is completely input into the main computer 1 from the digitizer and is converted into data and commands indicating which point therein is to be connected to which point. The main computer 1 transmits these data and commands appropriately to the subcomputer 3 by way of the buffer memory 2. The subcomputer 3 converts the data and commands supplied from the main computer 1 into a format which is proper for processing in the processing circuit and outputs the results to the processing circuit 4.

The processing circuit 4 converts the commands into data for each of the pixels of the graphic display device by processing the commands indicating which point therein is connected to which point and stores the data in the frame memory 5 according to the instructions from the subcomputer 3. And the data relating to each of the pixels in the frame memory 5 is given to the graphic device 6 which displays the desired wiring pattern after converting this data into a TV signal format.

The operator checks the wiring pattern displayed and corrects it if there is an error and makes up a final or hard drafted wiring pattern with an automatic drafting machine if there is no error.

Figure 3:
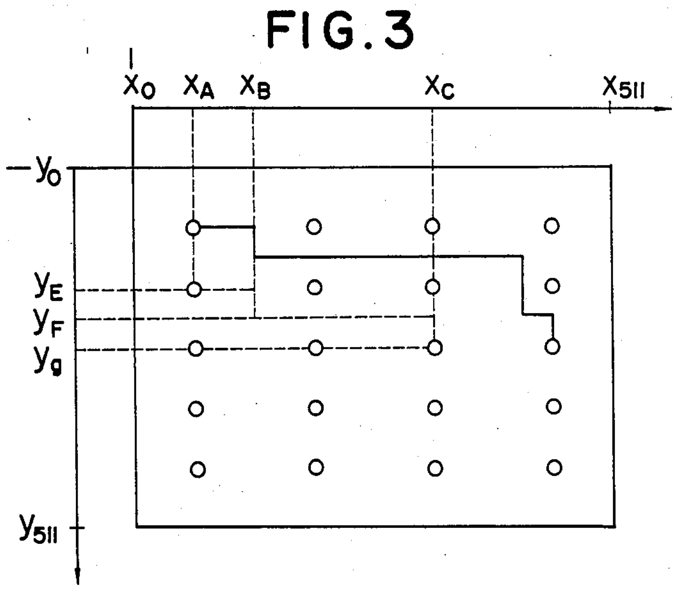
FIG. 3 is an explanatory diagram showing the exemplary case of designing a printed circuit board using a graphic display output system.

It is often the case that such a wiring pattern requires some amendment or correction due to errors in the original or due to errors in the inputting of data or commands even when the original is proper. In such a case, it is desirable that when amending the mistaken wiring pattern portion (such as the portion indicated by dashed lines in FIG. 3) into a correct wiring pattern portion (such as the portion indicated by solid lines in FIG. 3) the mistaken wiring pattern portion should be distinguishable on the screen of the graphic display device from other correct wiring pattern portions which do not require to be altered, none of which are shown in FIG. 3. In FIG. 3 only a simple wiring pattern is illustrated, for ease of understanding, but of course in practice the wiring patterns will be much more complicated. Accordingly, it is very important that the mistaken portion of the wiring pattern should be easily distinguishable from other correct portions.

Conventionally, in order easily to distinguish the mistaken portion or portions of the pattern from the other correct portions, methods have been practiced such as a first method of simply flashing the pertinent portions, or a second method of varying the light emitting intensity of the pertinent portions with software, or a third method of varying the light emitting intensity of the pertinent portions while adding visual effects such as image persistence by moving a light pen or a cursor over the specific portion itself.

Flashing or keeping constant the light emitting intensity is possible with hardware, but when varying the light emitting intensity with time since the processing is performed by software there is the shortcoming that the main job processing capability of the subcomputer 3 drops due to its being required to perform such software processing.

Figure 4:
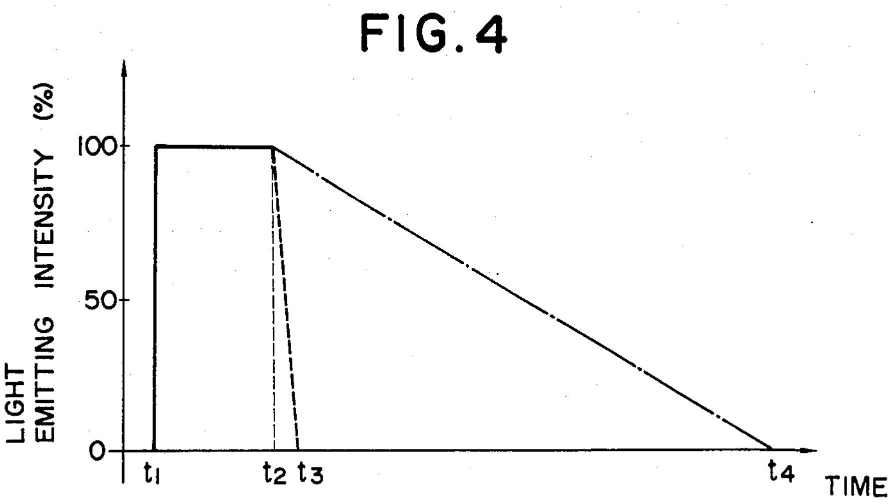
FIG. 4 is a graph in which time is shown on the horizontal axis and light emitting intensity in percent is shown on the vertical axis, showing the manner in which the light emitting intensity of the screen of a CRT decreases when the CRT is switched off, both when a short light persistence fluorescent material is used for the screen of the CRT, and when a long light persistence fluorescent material is used.

Now, the fluorescent screen materials or phosphors used in CRTs (cathode ray tubes) which are widely used in graphic display devices either have short light persistence or long light persistence, and exemplary persistence outlines are shown in FIG. 4, which is a graph in which time is shown on the horizontal axis and light emitting intensity in percent is shown on the vertical axis. Referring to FIG. 4, when the signal to the cathode ray tube abruptly becomes zero at time $t_2$, the light emission becomes zero at time $t_3$ according to the dashed line in the case of a short light persistence fluorescent material with light persistence time, for instance, a few milliseconds, and becomes zero at a time $t_4$ according to the chain dotted line in the case of a long light persistence fluorescent material with persistence time, for instance, a few tens of seconds.

Therefore when the light emitting intensity of a display to be shown on a graphic display device is desired to be changed rapidly a CRT using a short light persistence type fluorescent material is desirably used, but when rapid light emitting intensity changing rate is not desired a CRT using fluorescent material with a long light persistence may be used. However, the present invention provides a control method and a device which can change the light emitting intensity changing rate over a wide range from rapid to slow by using a CRT using on its screen a fluorescent material with a short light persistence.

Next, a concrete example of the control of the light emitting intensity changing rate of a graphic display device 6 will be described.

Figure 5:
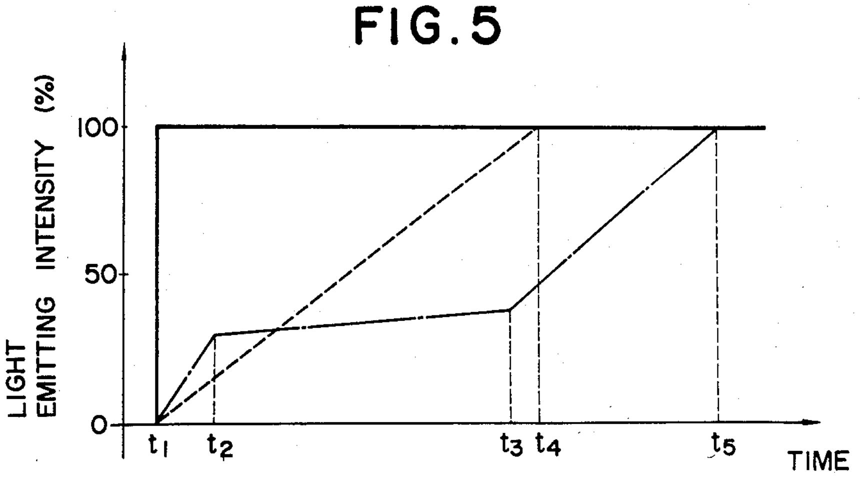
FIG. 5 is a graph in which time is shown on the horizontal axis and light emitting intensity in percent is shown on the vertical axis, showing several examples in which light emitting intensity of the screen of a CRT is increased from 0% to 100% in various different ways.

FIG. 5 is an example of increasing the light emitting intensity of a CRT. In this figure, which again is a graph in which time is shown on the horizontal axis and light emitting intensity in percent is shown on the vertical axis, the solid line indicates the change of the light emitting intensity when the CRT is abruptly turned full on at time $t_1$. The dashed line indicates the change of the light emitting intensity when the light emitting intensity of the CRT is controlled at a constant light emitting intensity changing rate from time $t_1$ to time $t_4$. And the chain dotted line indicates the change in the light emitting intensity when the light emitting intensity of the CRT is controlled at three different light emitting intensity changing rates sequentially: a high positive light emitting intensity changing rate from time $t_1$ to time $t_2$, a low but positive light emitting intensity changing rate from time $t_2$ to time $t_3$, and another high positive light emitting intensity changing rate from time $t_3$ to time $t_4$. Only these two examples are illustrated, but there are of course various other possibilities, such as for example increasing the light emitting intensity non linearly (for instance exponentially, logarithmically, trigonometrically, or in a polynomial fashion), or others; and of course the possibility exists of keeping the light emitting intensity level at an intermediate level or reducing it temporarily, according to need.

Figure 6:
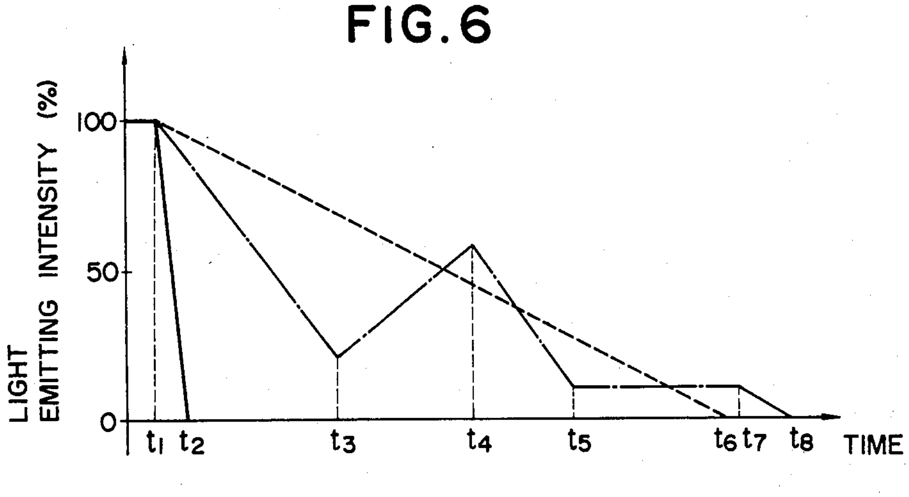
FIG. 6 is a graph in which time is shown on the horizontal axis and light emitting intensity in percent is shown on the vertical axis, showing several examples in which light emitting intensity of the screen of a CRT is decreased from 100% to 0% in various different ways.

FIG. 6 shows an example of reducing the light emitting intensity of the CRT, when its light emitting intensity is to be reduced to zero.

In this figure, which again is a graph in which time is shown on the horizontal axis and light emitting intensity in percent is shown on the vertical axis, when no control is made of the light emitting intensity changing rate of the CRT, and it is merely abruptly switched off at time $t_1$, then the light emitting intensity decreases sharply to reach zero at a time $t_2$ as indicated by the solid line. The dashed line corresponds to the case in which the light emitting intensity changing rate of the CRT is kept at a constant negative value as the light emitting intensity decreases to zero from time $t_1$ to time $t_6$. The chain dotted line corresponds to the case when the light emitting intensity changing rate of the CRT is kept at a constant fairly large negative value from time $t_1$ to time $t_3$, is then kept constant at a positive value from time $t_3$ to time $t_4$, is kept at another negative value from time $t_4$ to time $t_5$, is kept zero to provide a constant light emitting intensity from time $t_5$ to time $t_7$, and is then kept at yet another constant negative value from time $t_7$ to time $t_8$. In this case also, various modifications are possible as required, as in the case of increasing the light emitting intensity.

Figure 7:
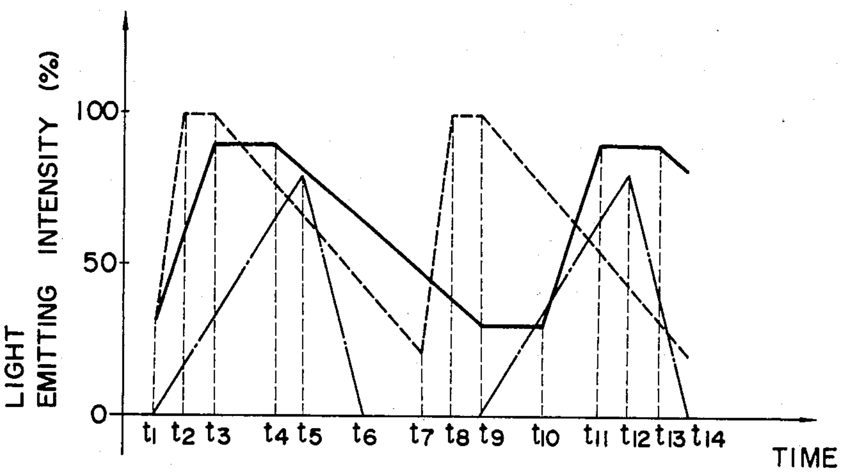
FIG. 7 is a graph in which time is shown on the horizontal axis and light emitting intensity in percent is shown on the vertical axis, showing several examples in which light emitting intensity of the screen of a CRT is cyclically controlled in various different ways.

FIG. 7 shows an example of cyclically changing the light emitting intensity of a CRT.

In this figure, which again is a graph in which time is shown on the horizontal axis and light emitting intensity in percent is shown on the vertical axis, the solid line corresponds to an example in which the light emitting intensity is cyclically varied from 30% to 90% and the increasing rate and the reducing rate for the light emitting intensity are not the same. The dashed line corresponds to an example in which the light emitting intensity is cyclically varied from 20% to 100% and the increasing rate and the reducing rate for the light emitting intensity are likewise different. And the chain dotted line corresponds to an example in which the light emitting intensity is cyclically varied between 0% to 80% and likewise the increasing rate and the decreasing rate for the light emitting intensity are different. In this case also, various modifications are possible as required, as a matter of course.

According to the method and the device of the present invention, it becomes possible to appeal to the visual sense of the operator by producing a visual impression different from the simple flashing control of a desired portion of a pattern on a CRT, and distinguishing a plurality of specific portions thus becomes easier for the operator. Next, a device for controlling the light emitting intensity of a CRT in such a way will be described.

Figure 8:
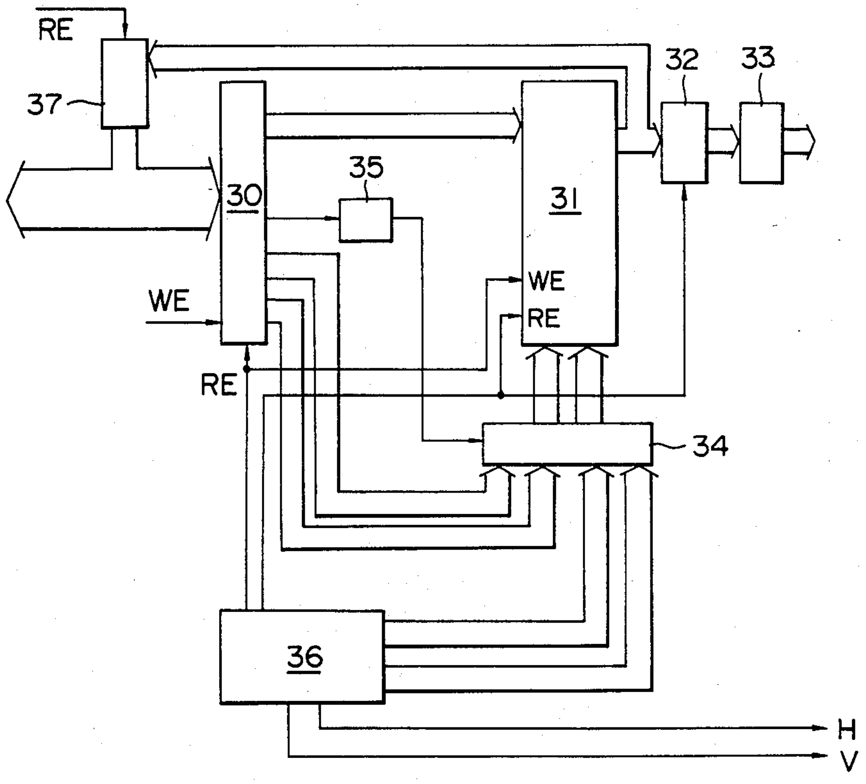
FIG. 8 PRIOR ART
FIG. 8 is a block diagram showing an example of the structure and components provided around a frame memory in the case of conventional software type light emitting intensity control.

FIG. 8 is a block diagram showing an example of the structure and components provided around the frame memory 5 in the case of conventional software type light emitting intensity control in the conventional device shown in FIG. 1. In this figure, 30 denotes a buffer memory, 31 denotes a frame memory, 32 denotes a latch, 33 denotes a D/A converter, 34 denotes a selector, 35 denotes a gate circuit, 36 denotes a clock pulse generating circuit, and 37 denotes a bus driver.

Figure 9:
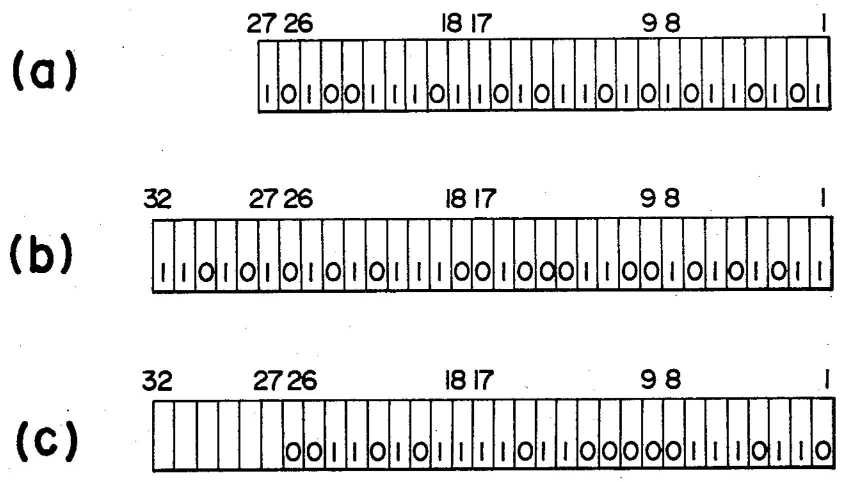
FIG. 9, which consists of three figures (*a*), (*b*), and (*c*), shows the bit pattern utilization layout of the signal from a computer both in an example of a conventional light emitting intensity control method and in the preferred embodiment of the present invention.

In this exemplary case, the signal from the subcomputer 3 is assumed to consist of twenty seven bits, which are utilized, as illustrated in FIG. 9(*a*), as follows: for the brightness signal, 8 bits; for the x address of the position signal, 9 bits; for the y address of the position signal, 9 bits; and, for the control signal, 1 bit. This means that the x dimension of the screen is divided into 512 divisions and the y dimension is likewise divided into 512 divisions, and that each of the thus defined pixels can be displayed with any one of 256 gradations of brightness on the CRT display, and presupposes the use of a monochromatic CRT. If a multicolor display is to be provided on a multicolor CRT, as a matter of course it would be required to provide about three times the volume of data.

To receive this data, the buffer memory 30 may consist of seven first-in-first-out memories, which may for example be of the type SN74S225 made by Texas Instruments, which connected in parallel may be used to store up to 16 sets of 32 bit data.

The frame memory 31 has a capacity of about 6.4 megabits so as to store the brightness signal at 256 brightness gradation levels and a control signal of one bit for each of the 262,144 (512×512) pixels.

Each twenty seven bits of data from the subcomputer 3 is sequentially stored in the buffer memory 30, according to the write signal from the subcomputer 3. The stored data is read out according to the readout signal (the same as the write signal of the frame memory 31) from the clock signal generating circuit 36 and the light emitting intensity signal U is written into the frame memory 31 with the x addresses and y addresses which determine which pixels are to be energized being designated.

In this case, when the light emitting intensity signal U is needed to be written into the frame memory 31, "1" is set up in the top position in the bit pattern of FIG. 9(*a*) for instance as a control signal for the selector 34, and by detecting this with an AND gate 35 for instance the position signal out of the output signal of the subcomputer 3 is selected as the x address and the y address of the frame memory 31 to store the output of the buffer memory 30.

As the subcomputer 3 erases the said control signal once the light emitting intensity signal U for one frame (512×512 pixels) has been input into and stored in the frame memory 31 as described above, the selector 34 in turn sequentially reads out the brightness information of each pixel written into the frame memory 31 according to the x address and the y address supplied from the clock signal generator 36 and, when raster scanning or random scanning is being performed, maintains the light emitting intensity signal U at the latch 32 only during the time that each pixel is energized.

This signal is input into the D/A converter 33 and after being converted into an analog signal is input into the graphic output device 6. In the meantime a horizontal synchronization signal H and a vertical synchronization signal V are supplied to the graphic display device 6 from the clock signal generating circuit 36. Thus the desired graphic display is output on the graphic display device 6 according to the twenty seven bit data from the computer 1 as described above.

Now, when it is desired to vary the light emitting intensity of a certain pixel, the x address and the y address of the frame memory 31 are output from the subcomputer 3, the light emitting intensity signal of the designated pixel is fed to the subcomputer 3 from the frame memory by way of the bus driver 37, the light emitting intensity is subjected to computation according to a predesignated program, and the result of this computation is again output to the frame memory 31 as a new light emitting intensity signal U.

In the device of FIG. 8, when the wiring pattern shown by the solid line and by the dashed line in FIG. 3 is desired to be displayed distinctly from other portions of the wiring pattern not shown in the drawing, the above described operation is insufficient.

For instance, when the wiring pattern indicated by a dashed line is desired to be made distinct from other portions of the wiring pattern, it may be desired to cause the wiring pattern indicated by the dashed line to flash while keeping the remaining portion of the wiring pattern always emitting light, or to give the dashed line portions a light emitting intensity different from that of the other portions of the wiring pattern, or to change the light emitting intensity of the dashed line wiring pattern with time, and to control the light emitting intensity changing rate, or to use a combination of the above possibilities.

To achieve such display effects in the conventional device whose partial block diagram is shown in FIG. 8 the control is made by a computer not shown in the drawing using software. For instance, with regard to the dashed line pattern shown in FIG. 3 it suffices if the light emitting intensity signal U and the control signal of the selector 34 are sent out from the computer in respect of the pixels with addresses $(x_A, y_E)$, $(x_{A+1}, y_E)$, . . . $(x_B, y_E)$ (i.e., the upper left horizontal line portion), the pixels with addresses $(x_B, y_E)$, $(x_B, y_{E+1})$, . . . $(x_B, y_F)$ (i.e., the left vertical line portion), the pixels with addresses $(x_B, y_F)$, $(x_{B+1}, y_F)$, . . . $(x_C, y_F)$ (i.e., the right horizontal line portion), and the pixels with addresses $(x_C, y_F)$, $(x_C, y_{F+1})$, . . . $(x_C, y_G)$, (i.e., the lower right vertical line portion). Similarly, with regard to the solid line portion, only light emitting intensity control signals and control signals need be sent out from the computer relating to those pixels which are actually on the line portion.

In the case of flashing it suffices if data obtained by converting the values of the light emitting intensities 100% and 0% into binary are input alternatingly at a certain frequency. And when the light emitting intensity is desired to be changed at a certain changing speed it suffices if binary data which appropriately changes the light emitting intensity with time are sequentially input.

If the above described method is performed the object of displaying parts of the wiring pattern distinctly is certainly accomplished, but much time is taken, because the subcomputer 3 is controlling the light emitting intensity of the wiring pattern which is desired to be made distinct, and there arises the shortcoming that this computer processing takes a long time, thus making it impossible to dedicate the subcomputer 3 to making up the wiring pattern, according to the commands from the main computer 1, which is its original job.

Figure 10:
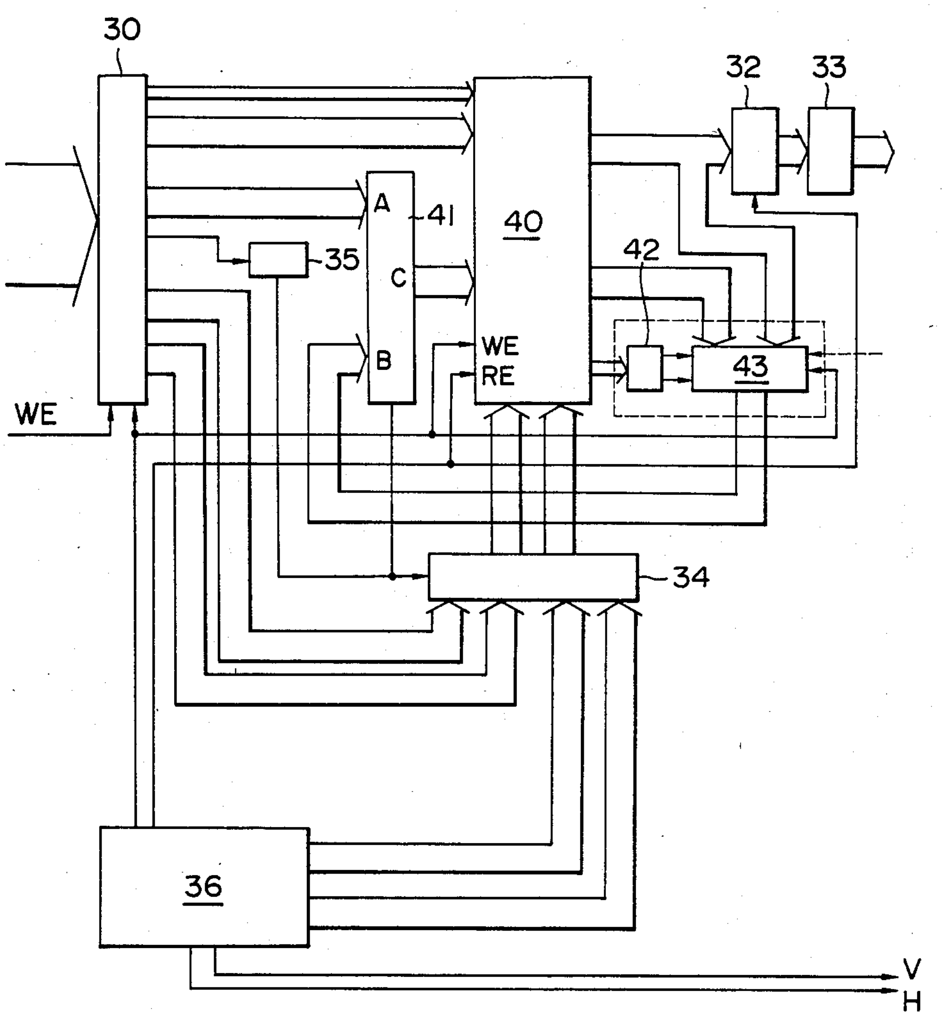
FIG. 10 is a block diagram showing an example of the structure and components provided around a frame memory in the case of the preferred embodiment of the graphic output system according to the present invention.

Now the preferred embodiment of the present invention will be described, and it will be explained how it improves upon the above mentioned prior art, obviating the above mentioned shortcoming. FIG. 10 is a block diagram, similar to FIG. 8 for the prior art, showing an example of the structure and components provided around the frame memory in the case of this preferred embodiment of the graphic output system according to the present invention. In this drawing, 30 denotes a buffer memory, 40 denotes a frame memory, 32 denotes a latch, 33 denotes a D/A converter, 34 and 41 denote selectors, 35 denotes a gate, 36 denotes a clock signal generating circuit, 42 denotes an instruction decoder, and 43 denotes a computational unit.

If the number of pixels on the CRT is assumed to be $512\times512$ and the number of gradations of light emitting intensity level is assumed to be 256, the output signal from the subcomputer 3 then requires at least 26 bits as described above. If this output signal is assumed to consist of 32 bits including a control signal, eighteen bits are allocated to the address (x, y) of each pixel, eight bits to the light emitting intensity, and six bits to control. The number of bits used for these signals and their configuration may be appropriately decided upon according to the convenience of design.

When a wiring pattern is desired to be displayed on the graphic display device 6, then, as in the case with a conventional method, a control signal for selecting the selectors 34 and 41 to the buffer memory 30 side is set up, the signal stored in the buffer memory 30 is sequentially stored into the frame memory 40 while designating the addresses, then the signal (for instance the uppermost bit in FIG. 9(*a*)) controlling the selectors 34 and 41 is terminated upon completion of the storage of the necessary volume of data, and the x address and the y address supplied from the clock signal generating circuit 36 are supplied to the proper terminals of the frame memory 40 via the selector 34 while these addresses are supplied to the input terminals of the frame memory 40 via the selector 41 only when the output from the computing unit 43 is required.

Therefore the light emitting intensity signal U for each pixel stored in the frame memory 40 is input to the latch 32 for each pixel according to the address designation by the clock signal generating circuit 36 and is retained in the latch 32 for the necessary time period and, after it has been converted into an analog signal by the D/A converter 33, the desired wiring pattern is displayed by sending out a horizontal synchronization signal H and a vertical synchronization signal V from the clock signal generator 36 to the graphic output device 6. So far, this is the same as the conventional method.

Next, the control method for light emitting intensity which is the point of the present invention will be described.

In the conventional method, when the light emitting intensity of a certain pixel is desired to be changed, the subcomputer 3 has to send out a light emitting intensity signal U which is variable with the progress of time to each of the pixels concerned in a certain way.

On the other hand, according to the present invention, as long as a change start signal, a change pattern signal, and a change pattern modification signal, in principle, are given from the subcomputer 3 when the light emitting intensity is desired to be changed, it suffices if a termination signal is sent out when the variation of the light emitting intensity is desired to be terminated.

When software is used to change the light emitting intensity of parts of the displayed wiring pattern, each of the pixels receives a light emitting intensity signal U at each time step, but since even one line of the wiring pattern is composed of a very large number of pixels the number of the pixels is so great that if their light emitting intensity signals are to be given repeatedly from time to time the processing time used by the subcomputer 3 becomes substantially great.

However, according to this invention the subcomputer 3 needs to send out a signal only when starting a change and when terminating a change. In some cases it suffices if all the control signals are sent out at the beginning of a light emitting intensity control operation and the advantage of drastically reducing processing time used by the subcomputer 3 and thus substantially dedicating the subcomputer 3 to its initial or original job is obtained by referring to FIG. 17, the general operational sequencing of the present invention is shown, which will be contained in the software controlling the present invention.

In the preferred embodiment of this invention shown in FIG. 10, when the light emitting intensity of a certain pixel is to be controlled, a signal consisting of the x address and the y address (18 bits in all) of the pixel, a change pattern signal of three bits, a control signal (start of a change and termination of a change) of two bits and a control signal for the selectors 34 and 41 of one bit is output from the subcomputer 3 at the necessary time point. An example of the structure of this signal is shown in FIG. 9(*b*).

Now the layout will be described from the lowermost bit to the uppermost bit in this figure. The lowermost eight bits correspond to the light emitting intensity signal U, the following nine bits to the x address of the pixel, the following nine bits to the y address of the pixel, the following three bits to a change pattern signal, the following two bits to the start and the termination signal of light emitting intensity control, and the uppermost one bit to the control signal for the selectors 34 and 41. The allocation of each of these bits may be modified according to purpose in other embodiments, as a matter of course.

In FIG. 10, when the uppermost two bits are "1" as shown in FIG. 9(*b*), the gate 35 detects that the uppermost bit is "1" and sets only the selector 34 in active state, the x and y address signals of the buffer memory 30 are input to the address terminal of the frame memory 40, and the light emitting intensity signal U, the change pattern selection signal, and the light emitting intensity control signal are stored in addresses which are different from those storing the light emitting intensity signal U of the frame memory 40.

In a similar way the totality of the control signals, the change pattern selection signal, and the light emitting intensity control signal of the pixels whose light emitting intensity is desired to be controlled is input to the frame memory 40 for the whole frame. This concludes the inputting of control instructions.

In the next frame the output (RE) signal of the clock pulse generator 36 reads out the data which have been previously stored in the frame memory 40, and the output of the computing unit 43 is made to be the same as the light emitting intensity signal stored in the frame memory 40 as far as the pixels which are not to be light emitting intensity controlled are concerned.

In other words, when an addition or subtraction is carried out in the computing unit 43 zero is added or subtracted to the light emitting intensity signal U, or when a multiplication or division is to be carried out unity is multiplied to the light emitting intensity signal U or is divided thereinto, so that the output signal of the computing unit 43 is the same as the input light emitting intensity signal U, and the same data is again written into the same x and y address by way of the selector 41. This is for the purpose of unifying the flow of data. Therefore, even when the light emitting intensity is to be controlled, it suffices if the subcomputer 3 outputs the light emitting intensity signal U as well as the address (x and y) signal only once.

On the other hand, when the light emitting intensity of a certain pixel is to be controlled, the control signal is output, the function of the computing unit 43 is selected from ADD, SUBTRACT, MULTIPLY, DIVIDE, and others, the light emitting intensity (B input) and the computational constant (A input) which is in principle output from the frame memory 40 are computed for each pixel, and the results are stored as the light emitting intensity signal U of the same address of the frame memory 40.

On the next frame the light emitting intensity signal U is read out from the frame memory 40, is retained in the latch 32 for a time period during which the corresponding pixel emits light, and is converted into the input signal to the graphic display device 6, and in the meantime a new computational result (the next light emitting intensity signal) is derived by carrying out computation in the computing unit 43 using a computational constant which is equal to or different from the preceding computational constant, and using the light emitting intensity signal U of the previous frame (the preceding computational result), and the result is stored in the same address of the frame memory 40 by way of the selector 41.

While in its turn this light emitting intensity signal U is input to the latch 32 and to the graphic display device 6 to display the desired pattern, the same or a different computation is performed. Thus, by repeating such a computation over a desired time period according to initially set up control instructions, the light emitting intensity of the necessary portion of a wiring pattern is controlled to make it distinct from other portions.

Depending on the structure of the computing unit, the configuration of the signal and the number of signal lines of the subcomputer 3 and the capacity of the frame memory 40 may vary.

Next, the action of the computing unit 43 surrounded by the dashed line in FIG. 10 will be described.

Figure 11:
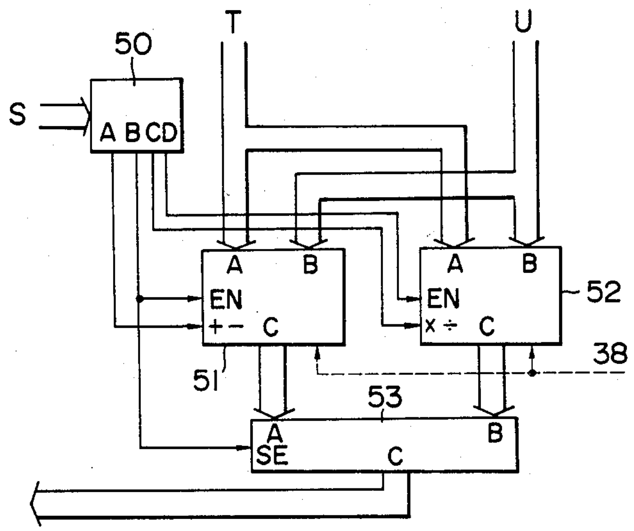

FIG. 11 shows an example of a computing unit 43 which carries out addition, subtraction, multiplication, and division. In this drawing, the reference numeral 50 denotes an instruction decoder, and 51 denotes a logic computing element which carries out addition or subtraction according to an external signal and may be of the type SN74S181 made by Texas Instruments, for instance. 52 denotes a ROM (read only memory) which, used for carrying out multiplication or division at high speed, outputs a product using the multiplicands as addresses when carrying out a multiplication, and outputs the quotient using the dividends as addresses when carrying out a division. 53 is a selector which connects a signal selectively to either one of two branches according to an input signal, and is for instance of the type SN74S157 made by Texas Instruments.

The operation of this computing unit is to input the control signal of three bits out of the output signal from the subcomputer 3 to the instruction decoder 50. The instruction decoder 50 produces zero at its output terminals A, B, C, D when it is receiving no command, and when it receives a control signal of (1, 0, 0) in binary it produces "1" at its output terminals A, B as an addition command. Similarly, when the control signal is (1, 0, 1), the instruction decoder 50 produces "1" at its output terminal B as a subtraction command, and when the control signal is (1, 1, 0), it produces "1" at its output terminals C and D as a multiplication command; and when the control signal is (1, 1, 1), it produces "1" at its output terminal D as a division command.

The adder/subtractor 51 receives input of a constant T for addition and subtraction at its input terminal A, receives a light emitting intensity signal U for addition and subtraction at its input terminal B, receives the output B of the command decoder 50 at its ENABLE (EN) terminal, receives the output A of the command decoder 50 at its function switchover (plus/minus) terminal, and sends output to the input terminal A of the selector 53 from its output terminal C.

In the multiplier/divider 52, the input terminal A is also supplied with the constant T for multiplication and division, the input terminal B is supplied with the light emitting intensity signal U for multiplication and division, the enable terminal (EN) is supplied with the output D of the command decoder 50, and the function switchover (multiply/divide) terminal is supplied with the output C of the command decoder; and this multiplier/divider 52 sends output from its output terminal C to the input terminal B of the selector 53. The switchover signal (SE) input terminal of the selector 53 is connected to the output terminal B of the command decoder 50.

Therefore when the control signal from the subcomputer is (1, 0, 0) the sum of the constant T and the light emitting intensity signal U with the adder/subtractor 51 functioning as an adder is output to the input terminal A of the selector 53, and when the control signal is (1, 0, 1) the difference between the constant T and the light emitting intensity signal U with the adder/subtractor 51 functioning as a subtractor is output to the input terminal A of the selector 53.

At this moment, since the SE terminal of the selector 53 is "1", the signal at its input terminal A is output.

When the control signal from the subcomputer 3 is (1, 1, 0), the product of the constant T and the light emitting intensity signal U with the multiplier/divider 52 functioning as a multiplier is output to the input terminal B of the selector 53, and when the control signal is (1, 1, 1), the quotient of the constant T and the light emitting intensity signal U with the multiplier/divider 52 functioning as a divider is output to the input terminal B of the selector 53.

At this moment, since the SE terminal of the selector 53 is "0", the signal at its input terminal B is output.

Figure 12:
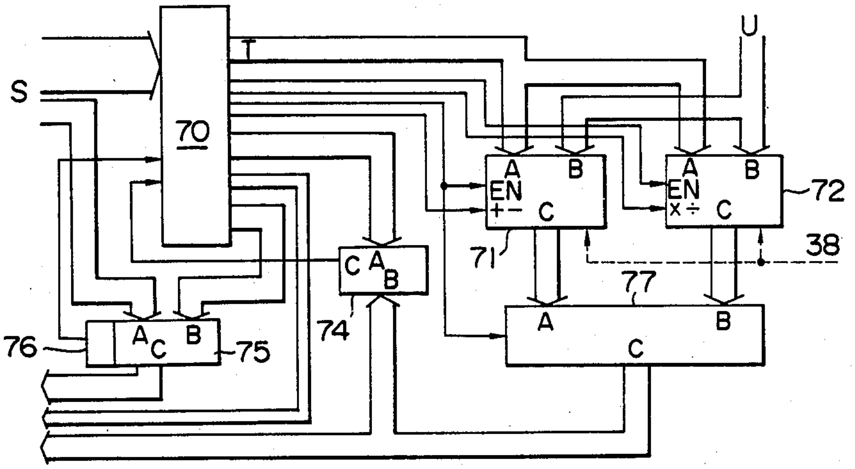

FIG. 12 shows another embodiment of the computing unit 43 which is shown as a block in FIG. 10.

In this figure, 70 denotes an instruction decoder, 71 denotes an adder/subtractor, 72 denotes a multiplier/divider, 74 denotes a comparator 75 denotes a loop counter, 76 a denotes zero detecting circuit, and 77 denotes a selector.

This structure is different from the previous one in that the computational constant T is input by way of the instruction decoder 70 instead of directly inputting it from the frame memory 40, and due to this change the instruction decoder 70 has an additional input S. In this embodiment, the computational constant T is input by way of the instruction decoder 70 but of course the computational constant T might alternatively be given from the subcomputer 3.

The action of this structure is as outlined in the following. For the purpose of achieving a light emitting intensity control pattern which is previously determined in the instruction decoder 70, coded data for the computational constant T which is required for each time point and a choice of an operation from addition, subtraction, multiplication, division, and possibly others are stored in internal ROM, and according to the program in the subcomputer 3 these data are subjected to various computations in conjunction with the light emitting intensity signal U to achieve various light emitting intensity controls.

First, as for the computational constant T, this computational constant T is defined within a certain range and it is stored in the ROM incorporated in the instruction decoder 70 with its address designated and is read out as required into the computing units 71, 72, with the address designated.

On the other hand, it is also possible as an alternative to directly input the computational constant T from the subcomputer 3 to the computing units 71, 72. The computational result obtained from the computational constant T and the light emitting intensity signal U is selectively output by the selector 77 so that the output is stored in the frame memory 40 as a new light emitting intensity signal U defining the light emitting intensity of a certain pixel.

In this case, since a comparator 74 is incorporated in the structure, it is possible to monitor or see to it that the computational result does not exceed the maximum light emitting intensity and does not go below the minimum light emitting intensity, and it is possible to terminate the computation, change the computational constant, or to change the kind of computation when the computational result has become equal to the maximum light emitting intensity or the minimum light emitting intensity. It is also possible to change the computational constant or the kind of computation when the light emitting intensity is for instance 35%, and various other forms of complex light emitting intensity control are possible.

When the change rate of the light emitting intensity is desired to be increased or decreased, this may be done by increasing or reducing the computational constant, but it is also possible to change the number of operations within a certain time period while keeping the computational constant at a constant value. In other words, the computational cycle time is set to be equal to the frame cycle time as determined by the display system of the graphic display device in this embodiment, but it is also possible to use a computational cycle time which is not related to the frame cycle time, for instance by the operator sending out a computational command signal, when necessary.

The loop counter 75 is included in this structure. This counter may be a presettable down counter, for instance, and it is possible to repeat a light emitting intensity control of a certain pattern over a necessary time period by detecting the time point when it becomes zero with the agreement circuit 76 after the subcomputer 3 has preset a certain constant on the loop counter 75. After that it is possible to maintain a certain light emitting intensity or to perform a light emitting intensity control of a different pattern over a necessary time period.

By appropriately combining the functions of the comparator 74 and the loop counter 75, it is possible to achieve a light emitting intensity control combining various patterns.

Figure 13:
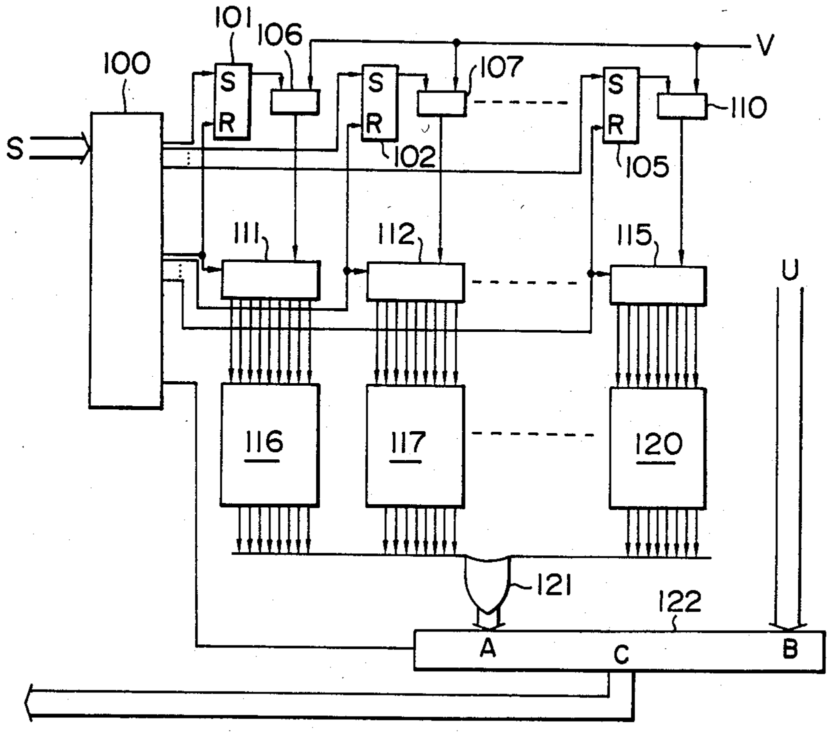
FIGS. 11 to 13 are block diagrams showing the constructional details of three different preferred embodiments of a computational unit which is shown as a block in FIG. 10.

FIG. 13 shows the details of yet another embodiment of the computational unit which is shown as a block in FIG. 10.

In this embodiment, several kinds of patterns for light emitting intensity control (i.e., processes of change of the light emitting intensity with the progress of time in coded form) are stored in ROM in advance, and only desired pixels are light emitting intensity controlled with the commands of the subcomputer 3 for each of them (the start and the end of light emitting intensity control and the designation of the kind of light emitting intensity control pattern). In this drawing, 100 denotes an instruction decoder, 101 to 105 denote flip flops, 106 to 110 denote AND gates, 111 to 115 denote counters, 116 to 120 denote memories, 121 denotes an OR gate, and 122 denotes a selector.

The subcomputer 3 inputs the signals encoded for the start and the termination of the light emitting intensity control and the kind of light emitting intensity control pattern out of the signals encoded from the address of the pixel for which light emitting intensity control is to be made, the start and the termination of the light emitting intensity control, and the kinds of light emitting intensity control patterns (five kinds in this embodiment) to the instruction decoder 100 by way of the frame memory 40.

When every pixel is to be light emitting intensity controlled, the selector 122 switches its B input to be output. It is hereinafter assumed that the light emitting intensity of a certain pixel ($x_n$, $y_n$) is subjected to the second light emitting intensity control pattern selected from the five kinds of light emitting intensity control pattern five times and then to the fifth light emitting intensity control pattern twice.

In this case, a signal such as (1, 1) is output at address ($x_n$, $y_n$) at a desired time point, the flip flop 102 is set, and the AND gate 107 is put into the conducting state. Since the counter 112 designating the address of the memory 117 is initially at zero, the data at address zero of the light emitting intensity control pattern shown in FIG. 14(*b*), for instance, is read out and output.

This output is input to the D/A converter 33 by way of the frame memory 40 and, after being converted into an analog signal, is displayed on the graphic display device 16. When the next frame comes, since the AND gate 107 is in the conducting state, a vertical synchronization signal V is input to the counter 112 to advance it by one count. Therefore at the next ($x_n$, $y_n$) address the memory 122 outputs the data at address 1 and displays it on the graphic display device.

Figure 14:
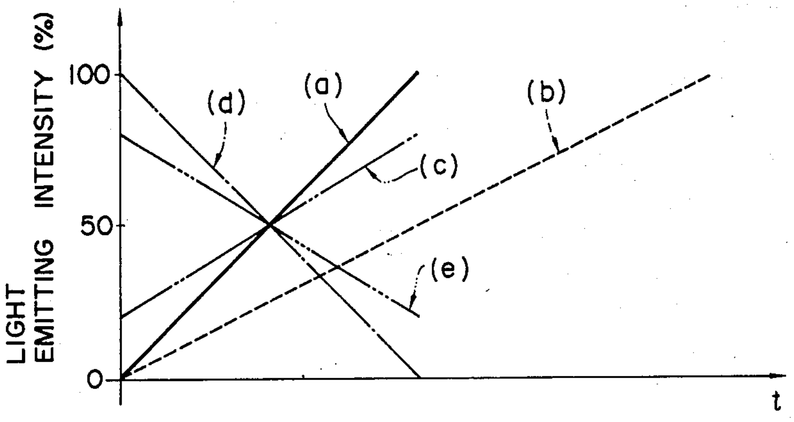
FIG. 14 is a graph in which time is shown on the horizontal axis and light emitting intensity in percent is shown on the vertical axis, showing several examples of control patterns for controlling the light emitting intensity of the CRT screen of a graphic display device.

Such an action is repeated for instance 200 times and the light emitting intensity control pattern of FIG. 14(*b*) is displayed on the graphic display device once. When this action is repeated thereafter and the light emitting control pattern of FIG. 14(*b*) is displayed on the graphic display device four times, a signal such as (1, 0) is output and the flip flop 102 and the counter 117 are reset.

Next, a different address is designated and a signal such as (1, 1) is output to the flip flop 105 to set it. In this embodiment, since the light emitting intensity control signal of FIG. 14(*e*) is stored in the memory 125, as in the previous case, the counter 120 advances the addresses one by one counting the vertical synchronization signal V and, upon repeating the light emitting intensity control pattern of FIG. 14(*e*) twice, outputs a signal such as (1, 0) to reset the flip flop 105 and the counter 122.

Figure 15:
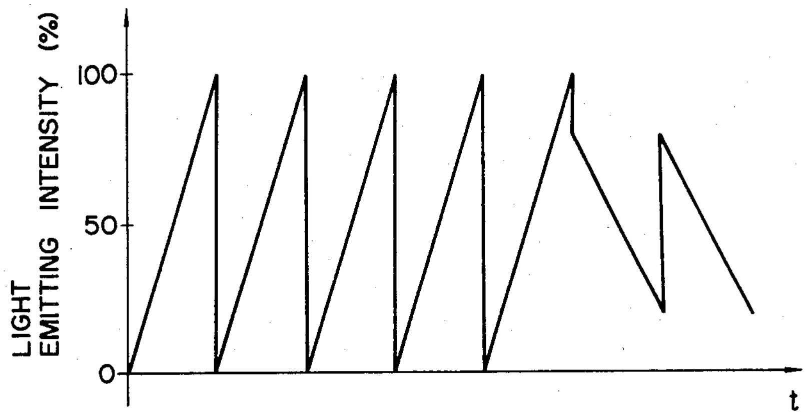
FIG. 15 is a graph in which time is shown on the horizontal axis and light emitting intensity in percent is shown on the vertical axis, showing an example in which two different control patterns are combined in the control of the light emitting intensity of the CRT screen of a graphic display device.

Thus, a light emitting intensity control as shown in FIG. 15 can be made for the pixel at address ($x_n$, $y_n$)

Moreover, other kinds of light emitting intensity control become possible such as the pixels at addresses ($x_1$, $y_1$), ($x_3$, $y_5$), ($x_8$, $y_9$) repeating the light intensity control pattern of FIG. 14(*a*) ten times, the pixels at addresses ($x_{20}$, $y_{30}$), ($x_{30}$, $y_{50}$) repeating the light emitting intensity control pattern of FIG. 14(*b*) five times, and the pixels at addresses ($x_{20}$, $y_{80}$), ($x_{25}$, $y_{10}$) repeating the light emitting intensity control pattern of FIG. 14(*c*) thirty times.

Additionally, by adding a counter, an agreement circuit, or a frame memory to this computing circuit and by letting the control signals such as the address of a pixel, the kind of light emitting intensity control pattern, the start of light emitting intensity control, the change of a light intensity emitting control pattern, the end of light emitting intensity control, and the like be output once and for all from the subcomputer 3, it is possible to carry out the control of the light emitting intensity at the terminal end and to reduce the processing time of the subcomputer 3 used in connection with the output device 6 to the minimum by only sending the end signal of the light emitting intensity control to the subcomputer 3 as a result.

These control circuits may be varied or modified according to need without departing from the spirit of this invention.

FIG. 14, in which time is shown on the horizontal axis and light emitting intensity in percent is shown on the vertical axis, shows a few examples of light emitting intensity control patterns. In this drawing, the line "a" is an example of linearly increasing the light emitting intensity from 0% to 100%, the line "b" is an example of increasing linearly the light emitting intensity from 0% to 100% taking twice as much time as example "a" (in other words with a different light emitting intensity changing rate), the line "c" is an example of linearly increasing the light emitting intensity from 20% to 80%, the line "d" is an example of linearly decreasing the light emitting intensity from 100% to 0%, and the line "e" is an example of linearly decreasing the light emitting intensity from 80% to 20%.

In these examples, the light emitting intensity is linearly varied, but other possibilities for variation such as exponential functions, trigonometric functions, logarithmic functions, hyperbolic functions, or power series or polynomial functions may be used according to need.

Now there will be discussed the case where such a light emitting intensity control pattern is input into ROM. In the light emitting intensity control pattern indicated in line "a", when it is to be executed over a time of 50 V (one V corresponds to the display time for one frame), then 0 is input at address 0, 1 at address 1, 2 at address 2, 3 at address 3, . . . 49 at address 49, and 50 at address 50. Next, in the case of increasing the light emitting intensity from 0% to 100% using twice as much time as case "a", or in case "b", 0 is input at address 0, 0.5 at address 1, 1 at address 2, 1.5 at address 3, . . . 49.5 at address 99, and 50 at address 100. (Although these numbers are herein written in decimal for simplicity, both addresses and data will be of course in practice be set in binary).

As for other light emitting intensity control patterns, it suffices if the input is made taking into account the light emitting intensity at each moment.

Figure 16:
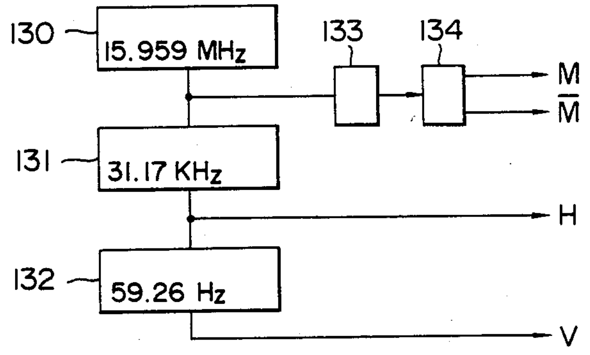
FIG. 16 is a block diagram showing the constructional details of an example of the clock generator circuit of FIG. 10.

FIG. 16 is an embodiment of the clock signal generating circuit denoted by 36 in FIG. 10.

In this drawing, 130 denotes a crystal oscillator circuit, 131, 132 and 133 denote flip flops each consisting of a plurality of stages, and 134 denotes a flip flop.

The crystal oscillator circuit 130 oscillates at 15.959 MHz, for instance, and the flip flop 131 divides this clock frequency appropriately and produces a horizontal cyclic synchronization signal H of 31.17 kHz. The flip flop 132 appropriately divides the horizontal cyclic synchronization signal H and produces a vertical synchronization signal V of 59.26 Hz. The flip flop 133 divides the clock frequency appropriately and supplies it to the flip flop 134 of the next stage, and the output of the flip flop 134, consisting of a clock signal of 62.34 kHz, provides the write pulse M and read pulse $\overline{M}$ for the frame memory 40. These clock frequencies are only examples and they may be appropriately determined according to the resolution power of the graphic output device and the convenience of the designer.

FIG. 17, as previously mentioned, depicts in flow diagram form, the general operational sequencing of the present invention. FIG. 17 basically summarizes the specific descriptions of the various steps and elements described in the present specification. As is well known in the art, the description of the processes and the constituent hardware which can be utilized to accomplish the methods contained herein are facilitated by software programming which enables and instructs the operation of the hardware. There are numerous ways in which to convert the described methods of the invention into operable software programming, all of which are known within the art.

As another method, there is a method in which a computation execution enable/disable signal 38 is input from outside to the adder/subtractor 51 and the multiplier/divider 52 of FIG. 11 or the adder/subtractor 71 and the multiplier/divider 72 of FIG. 12, and when execution is enabled the computation of the light emitting intensity is performed according to a predetermined computational procedure or a light emitting intensity control pattern. In the case of execution disable, the preceding light emitting intensity signal U for each pixel is again written into the frame memory 40 and is used as the light emitting intensity signal U of the next frame so that the light emitting intensity change is effected at an arbitrary time designated from outside instead of on the frame frequency.

In this case, by providing a switch for producing the computational execution enable/disable signal for the light emitting intensity control, it is possible to manually indicate when an arbitrary light emitting intensity is to be maintained without the operation of the subcomputer 3, if the changes of the light emitting intensity are sufficiently low in speed.

As described above, according to the method and the device according to this invention, the following advantages are obtained, as compared to the prior art.

First, by changing the light emitting intensity changing rate, it is possible to produce the same effect as when using various fluorescent materials which have persistences ranging from a short light persistence to long light persistence, even if a CRT using an ordinary short light persistence fluorescent material is used, and there is thus obtained an advantage in the cost of the CRT.

Next, it is possible to obtain the same effect as having a light persistence which is several times greater than that of a CRT using a long light persistence fluorescent material, and it is also possible to erase light emission in a short time, which is not conceivable with a CRT using a long light persistence fluorescent material.

Further, the time required for the light emitting intensity to increase from 0% to 100% (light emitting intensity changing rate) may be freely varied. However, the starting point and the end point for changing the light emitting intensity may not be 0% or 100%. And this is also the case when reducing the light emitting intensity.

Yet further, when performing light emitting intensity control, it is not necessary to input the light emitting intensity signal for each moment from a computer as conventionally, and since the processing time for the light emitting intensity control may be drastically reduced the time available for the computer to do its own job increases drastically. In other words, all the computer has to do is to provide a command (including data) specifying only the start of light emitting intensity control or the start of the light emitting intensity control, the point of modifying the light emitting intensity control, and the end of the light emitting intensity control.

Now, since the memory itself is not expensive, the increase in cost due to the addition of hardware is minor, yet the job processing time of the computer available for its own job is increased drastically.

Finally, special display effects may be obtained such as changing the light emitting intensity of a moving locus of an image with the progress of time in animation.

In the above, the present invention has been described mainly with respect to its application to a monochromatic graphic display device, but, as a matter of course, it may be utilized for controlling the light emitting intensity of a multi color graphic output device, by applying it to each one of the red, green, and blue channels of said multi color display device.

Although the present invention has been shown and described with reference to several preferred embodiments thereof, and in terms of the illustrative drawings, various possible modifications, omissions, and alterations could be conceived of by one skilled in the art to the form and the content of any particular embodiment, without departing from the scope of the present invention.

What is claimed is:

1. A method for light emitting intensity control in a graphic display device which performs brightness operations on every picture element of the graphic display device by utilizing picture element memory means in the graphic display device to which command signals are input from a computer, which allows the graphic display device to generate brightness signals by itself according to time duration without being fed any brightness signals from the computer, comprising the steps of:

displaying characters and graphic displays on the graphic display device according to commands from the computer;

controlling the light emitting intensity of a desired picture element by outputting only commands related to the light emitting intensity control from said computer by providing, associated with the graphic display device, a means for memorizing a group of numerical values corresponding to desired changes of light emitting intensity of a desired picture element belonging to a character or a graphic display displayed on the graphic display device.

2. A method for light emitting intensity control in a graphic display device according to claim 1, wherein the commands related to the light emitting intensity control include commands for change start, change pattern, change pattern modification, and change termination.

3. A method for light emitting intensity control in a graphic display device according to claim 2, wherein the light emitting intensity control is carried out as an arithmetic process, the light emitting intensity for a desired portion of said display varying according to said arithmetic process, said arithmetic process comprising at least one arithmetic function.

4. A method for light emitting intensity control in a graphic display device according to claim 3, wherein a parameter of the arithmetic process is supplied by a subcomputer.

5. A method for light emitting intensity control in a graphic display device according to claim 3, wherein parameters of the arithmetic process are stored in a ROM for selective utilization.

6. A method for light emitting intensity control in a graphic display device according to either one of claim 4 or claim 5, wherein said arithmetic process is repeated a desired number of times, the frequency of the arithmetic process is variable for producing different visual effects on the display.

7. A method for light emitting intensity control in a graphic display device according to claim 6, wherein the frequency of the arithmetic process is determined externally independently of the frame frequency of the display.

8. A method for light emitting intensity control in a graphic display device according to either one of claim 4 or claim 5, wherein said arithmetic process is repeated a desired number of times, the frequency of the arithmetic process is synchronized with the frame frequency of the display.

9. A method for light emitting intensity control in a graphic display device according to claim 8, wherein a loop counter is used for repeating a light emitting control pattern for a desired number of times.

10. A method for light emitting intensity control in a graphic display device according to claim 9, wherein a plurality of light emitting intensity control patterns are stored in ROM so that a desired pattern may be selected by a command from a computer.

11. A device for light emitting intensity control in a graphic display device which performs brightness operations on every picture element of the graphic display device by utilizing picture element memory means in the graphic display device to which command signals are input from an external source, which allows the graphic display device to generate brightness signals by itself according to time duration without being fed any brightness signals from the external source, comprising:

(a) a computer which inputs a light emitting intensity control start signal, a signal designating the light emitting intensity signal and the kind of computation, and a computational constant signal;

(b) a memory device which stores these signals;

(c) an instruction decoder for decoding these signals;

(d) a computation unit for computing a computational result, according to an arithmetic function, from the light emitting intensity signal and the computational constant; and (e) a display unit which displays at a light emitting intensity corresponding to the computational result of the computational unit.

12. A device for light emitting intensity control in a graphic display device according to claim 11, wherein the commands related to the light emitting intensity control include commands for change start, change pattern, change pattern modification, and change termination.

13. A device for light emitting intensity control in a graphic display device according to claim 12, wherein said computation unit comprises an arithmetic processor which carries out the light emitting intensity control according to an arithmetic process comprising at least an arithmetic function utilizing parameters.

14. A device for light emitting intensity control in a graphic display device according to claim 13, wherein the computational cycle of the computational unit is set to a frequency which does not synchronize with a frame frequency determined by the display system of the graphic display device.

15. A device for light emitting intensity control in a graphic display device according to claim 13, further comprising a ROM wherein parameters of the arithmetic process utilized by the arithmetic processor are stored for selective utilization.

16. A device for light emitting intensity control in a graphic display device acording to claim 13, further comprising a subcomputer which supplies a parameter of the arithmetic process.

17. A device for light emitting control in a graphic display device which performs brightness operations on every picture element of the graphic display device by utilizing picture element memory means in the graphic display device to which command signals are input from an external source, which allows the graphic display device to generate brightness signals by itself according to time duration without being fed any brightness signals from the external source, comprising:

(a) a computer which inputs a light emitting intensity control start signal and a light emitting intensity pattern selection signal;

(b) a first memory device which stores these signals;

(c) an instruction decoder for decoding these signals;

(d) a second memory device for storing a light emitting intensity control pattern;

(e) a counter for designating the address of the second memory in which the light emitting intensity control pattern is stored; and (f) a display unit which displays at a light emitting intensity corresponding to the light emitting intensity control pattern read out from the second memory.

18. A method for light emitting intensity control in a graphic display device which performs brightness operations on every picture element of the graphic display device by utilizing picture element memory means in the graphic display device to which command signals are input from an external source, which allows the graphic display device to generate brightness signals by itself according to time duration without being fed any brightness signals from the external source, comprising the steps of:

displaying characters and graphic displays on the graphic display device according to commands from a computer;

controlling the light emitting intensity of a desired picture element by outputting only commands related to the light emitting intensity control from said computer by providing, associated with the graphic display device, a means for obtaining numerical values coresponding to the light emitting intensity changes.

19. A method for light emitting intensity control to a graphic display device comprising the steps of, displaying characters in graphic displays on the graphic display device according to commands from a computer, controlling the light emitting intensity of a desired pixel by outputting only commands related to the light emitting intensity control from said computer by providing, associated with the graphic display device, a means for memorizing a group of numerical values corresponding to desired stages of light emitting intensity of a desired pixel belonging to a character or a graphic display displayed on the graphic display device, wherein the commands related to the light emitting intensity control include commands for change start, change pattern, change pattern modification, and change termination.

20. A method for light emitting intensity control in a graphic display device according to claim 19, wherein the light emitting intensity control is carried out as an arithmetic process, the light emitting intensity for a desired portion of said display varying according to said arithmetic process, said arithmetic process comprising at least one arithmetic function.

21. A method for light emitting intensity control in a graphic display device according to claim 20, wherein a parameter of the arithmetic process is supplied by a subcomputer.

22. A method for light emitting intensity control in a graphic display device according to the claim 20, wherein parameters of the arithmetic process are stored in a ROM for selective utilization.

23. A method for light emitting intensity control in a graphic display device according to either one of claim 21 or claim 22, wherein said arithmetic process is repeated a desired number of times, the frequency of the arithmetic process is variable for producing different visual effects on the display.

24. A method for light emitting intensity control in a graphic display device according to claim 23, wherein the frequency of the arithmetic process is determined externally independently of the frame frequency of the display.

25. A method for light emitting intensity control in a graphic display device according to either one of claim 21 or claim 22, wherein said arithmetic process is repeated a desired number of times, the frequency of the arithmetic process is synchronized with the frame frequency of the display.

26. A method for light emitting intensity control in a graphic display device according to claim 25, wherein a loop counter is used for repeating a light emitting control pattern for a desired number of times.

27. A method for light emitting intensity control in a graphic display device according to claim 23, wherein a plurality of light emitting intensity control patterns are stored in ROM so that a desired pattern may be selected by a command from a computer.

* * * * *